United States Patent

[11] 3,621,074

| [72] | Inventors | Erhard Siggel<br>Seckmauern;<br>Walter Rein, Obernburg; Horst-Manfred<br>Caesar, Erlenbach, all of Germany |
|---|---|---|
| [21] | Appl. No. | 778,310 |
| [22] | Filed | Nov. 22, 1968 |
| [45] | Patented | Nov. 16, 1971 |
| [73] | Assignee | Glanzstoff AG<br>Wuppertal, Germany |
| [32] | Priority | Nov. 27, 1967 |
| [33] | | Germany |
| [31] | | P 17 20 877.4 |

[54] PRODUCTION OF A MODIFIED DIGLYCOL THEREPHTHALATE POLYCONDENSATE FOR INJECTION MOLDING
12 Claims, No Drawings

[52] U.S. Cl. .................................................... 260/835,
260/47 C, 260/47 EP, 260/75 EP, 260/836,
260/837, 260/873
[51] Int. Cl. ...................................................... C08g 45/14,
C08g 17/01, C06g 17/007
[50] Field of Search ........................................... 260/835,
836, 837, 75 EP, 47 EP, 47 C

[56] References Cited
UNITED STATES PATENTS

| 2,901,466 | 8/1959 | Kibler et al. .................. | 260/75 |
| 2,998,408 | 8/1961 | Zoetbrood..................... | 260/75 EP |
| 3,372,143 | 3/1968 | Terada et al .................. | 260/75 EP |
| 3,390,134 | 6/1968 | Kibler............................. | 260/75 |

FOREIGN PATENTS

| 872,254 | 7/1961 | Great Britain................ | 260/835 |
| 1,251,950 | 10/1967 | Germany....................... | 260/75 EP |

*Primary Examiner*—John C. Bleutge
*Attorney*—Johnston, Root, O'Keefe, Keil, Thompson & Shurtleff ABSTRACT: Process of producing a polycondensate of a diglycol terephthalate especially suitable for injection molding purposes wherein the usual catalytic polycondensation is carried out after the incorporation of 0.1 to 5 percent by weight of a diglycidyl ether as a monomeric coreactant up to a solution viscosity of 1.4 to 1.8, at which point the polycondensate melt is immediately cooled and solidified, the product then being further condensed in the solid phase under an inert atmosphere at temperatures of 180° to 230° C. until the melt index of the product acquires a value of between 50 and 0.5 grams/10 minutes.

PRODUCTION OF A MODIFIED DIGLYCOL THEREPHTHALATE POLYCONDENSATE FOR INJECTION MOLDING

The reaction of terephthalic acid or terephthalic acid esters with glycols to form saturated linear polyesters is known. These polyesters are particularly suitable for the production of filaments and foils. These polyesters, particularly polyethylene terephthalate, are being used extensively for the manufacture of filaments and fibers for textile products and other technical uses.

Although linear polyethylene terephthalate has outstanding physical properties and a very good resistance to chemicals, it is not very suitable as a synthetic thermoplastic polymer for many other uses e.g., for the production of injection molded articles. This is because its dimensional stability at relatively high temperatures, in particular above the so-called second order transition point is inadequate.

The production of branched and cross-linked polyesters for dicarboxylic acids and glycols, using various trifunctional or tetrafunctional compounds, such as gylcerine or pentaerythritol, in the polycondensation is also known. The technically important alkyd resins (see B. Vollmert, Grundriss der makromolekularen Chemie, Springer-verlag Berlin, Göttingen, Heidelberg 1962, pages 136–7) are produced by this method and these are primarily used in the lacquer industry to obtain highly cross-linked film coatings.

If unsaturated dicarboxylic acids, such as maleic acid or fumaric acid, are used when preparing polyesters, then it is known that the resulting polyesters can be hardened (see Saechtling-Zebrowski Kunststofftaschenbuch 16th edition, Carl Hanser Verlag Munich 1965, page 273). For this hardening, these preliminary products are dissolved in styrene or other monomers, e.g., in vinyl acetate, acrylonitrile or allyl esters. After adding certain catalysts, hard or elastic synthetic resins are obtained by a cross-linking polymerization. For the curing operation it is necessary to control the conditions very carefully. During the curing, a very high shrinkage in volume occurs, and this can only be reduced to approximately half by the use of fillers.

In U.S. Pat. No. 2,720,500, there is disclosed a reaction of dicarboxylic acids, polyhydric alcohols and monogylcidic ethers of monosubstituted phenols, such as p-nonylphenol. The products which are produced by this method can only be used, however, for the production of coatings and lacquers.

It is also known from Swiss Pat. No. 350,111 that glycidic ethers, when used in small quantities, accelerate the polycondensation of glycol terephthalates and form polycondensates which can be processed to give filaments, fibers and foils. The polycondensates produced in this manner are not at all suitable for use as injection molding compositions. Because of the comparatively low melt viscosity of these polycondensate compositions, the mechanical properties of injection molded products produced therefrom, such as strength and impact resistance, are not satisfactory. The properties of the materials also change appreciably during the processing, so that is is not possible to obtain articles which have uniform or reproducible properties.

It has already been proposed to use a modified polyethylene terephthalate composition in an injection molding process by employing a melt blend of the polyester in admixture with certain diglycidic ethers and, if desired, to subject this composition to a heat treatment before it is injection molded. According to this proposed process, as disclosed in copending application Ser. No. 673,308, filed Oct. 6, 1967, the polyester is first produced and then melt blended with the diglycidic ether to form a homogeneous mixture. The mixture is regranulated and finally subjected to a thermal after-treatment. The granulated material is then ready as a composition for injection molding. Injection molded articles produced in this way have been demonstrated to possess very good properties. However, relatively large amounts of the diglycidic ether are generally required to yield the best properties.

One object of the present invention is to provide an improvement in the preparation of a diglycol terephthalate polycondensate for use as an injection molding composition, particularly so as to achieve dimensional stability at elevated temperatures and other valuable properties with proportionately smaller quantities of a diglycidic ether. These and other objects and advantages of the invention are explained in greater detail hereinafter.

It has now been found, in accordance with the invention, that one can achieve an improved process for the catalytic polycondensation of a diglycol terephthalate into an injection molding composition by observing the following steps:

A. incorporating as a monomeric coreactant with the diglycol terephthalate, as normally obtained from terephthalic acid or terephthalic acid esters and gylcols, about 0.1 to 5 percent by weight of a digylcidic ether of the formula $$CH_2-CH-CH_2-$$
$$\diagdown O \diagup$$

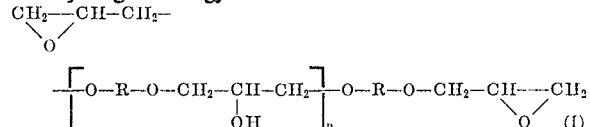

wherein $n$ is an integer of from 0 up to about 30 and R is a divalent radical selected from the class consisting of (1) a saturated aliphatic hydrocarbon of two to 10, preferably four to six, carbon atoms and (2) the residue of an epoxidized dihydric phenol, B. immediately cooling and solidifying the polycondensation reaction mixture after it has attained a solution viscosity of between 1.4 and 1.8, and C. subsequently further condensing this product of step (B) under an inert atmosphere and in the solid phase at a temperature between about 180° and 230° C. until the solid product has a melt index between 50 and 0.5 grams/10 minutes. The polycondensation step (A) is carried out at conventional temperatures of about 150° to 300° C., i.e., to provide a liquid or molten reaction mixture, while using a conventional polycondensation catalyst.

The product of this process cannot be defined in terms of its exact chemical structure, although it is known that the diglycidyl ether of formula (I) enters into the polycondensation reaction, it being essential to observe the conditions of solution viscosity and melt index of steps (B) and (C), respectively. Those compositions or products having a melt index of 1 to 20 grams/10 minutes are especially suitable for purposes of injection molding.

The addition of 0.5 to 3 percent by weight of the diglycidic ether is especially preferred.

In one embodiment of the process according to the invention, after the solidification step (B), 0.5 to 20 percent by weight of at least on polyolefin is added and uniformly mixed or melt blended with the composition. This mixture is then regranulated and is subsequently further condensed in accordance with step (C) at a temperature from 180° to 230° C. in the solid phase until a melt index of 50 to 0.5 grams/10 minutes has been reached. Polypropylene, poly-4-methylpentene-1 and polyethylene, and especially polyethylene which has a density of from 0.915 to 0.930, are particularly suitable for admixture with the intermediate product.

The diglycidic ethers of formula (I) which are used as monomers in the process according to the invention, i.e., as one of the starting materials for the preparation of an injection molding composition are readily available as commercial products, sometimes identified as di- or poly-epoxides of dihydric phenols but also referred to as glycidyl polyethers of dihydric phenols. They can be obtained in a conventional manner, e.g., by condensation of epichlorhydrin with one or more dihydric phenols, such as hydroquinone or 2,2-bis-(4-hydroxyphenyl) propane or with aliphatic glycols such as butane-1,4-diol. If more than 2 mols of epichlorhydrin are used per mol of the dihydric phenol, then low molecular weight products with the value $n=0$ in formula (I) are obtained. Reduction of the quantity of epichlorhydrin leads to compounds of increasingly higher molecular weight which, as is known, usually occur in polymeric form or so-called polyepoxides where $n$ is greater than zero. Commercially obtainable materials are usually given in terms of a mean molecular weight, from which the value of $n$ can be determined by a simple calculation. Since the commercial diglycidic ethers or polyepoxides are often mixtures or may have partially reacted epoxy groups, the value of $n$ may be a fraction of a whole number. Depending on the degree of condensation and the starting materials used, the digylcidic ethers are liquid, semisolid or solid substances. Thus, it is possible to use both the lower molecular weight diglycidic ethers where $n=0$ as well as higher molecular weight products with $n$ being as high as about 30.

Products in which $n$ is approximately 5 to 20, and especially 10 to 15, are preferred for use in the process according to the invention.

The dihydric phenols employed to obtain the diglycidic ethers of formula (I) are a well-known class of materials. They may be mono- or poly-nuclear phenols, preferably having one or two benzene nuclei, which can be connected directly together as in a bis-phenol or a dihydroxy naphthalene or joined by a hetero atom such as oxygen, by an aliphatic hydrocarbon bridge of one to six carbon atoms and usually a methylene bridge which may be further substituted by lower alkyl, or by another intermediate linkage such as -$SO_2$-. The phenyl or benzene rings, in addition to the essential hydroxy substituents ordinarily located in para-positions may also be further substituted with nonreactive or inert substituents, e.g., with halogen atoms such as bromine or chlorine. Where R in formula (I) is a saturated hydrocarbon radical, it may contain from two up to about 10 carbon atoms in a straight or branched chain, preferably with at least four carbon atoms between the oxygen ether linkages. Thus, the diglycidic ethers of formula (I) may also be derived by epoxidation from aliphatic glycols or alkane-diols of preferably four to six carbon atoms. Minor variations of the dihydric phenols or aliphatic glycols and their diglycidyl ether derivatives are well known and one can readily select any of these materials for use within the scope of the invention.

Suitable aliphatic glycols and dihydric phenols capable of forming the diglycidic ether (I) include the following, by way of example:
2,2-bis-(4'-hydroxyphenyl)-propane; 2,2-bis-(4'-hydroxyphenyl)-butane; hydroquinone; butane-1,4-diol; hexane-1,6-diol; 4,4'-dihydroxybenzophenone; bis-(4-hydroxyphenyl)-ethane; 1,5-dihydroxy-naphthalene; and bis-(p-hydroxyphenyl)-sulphone. Other suitable compounds include Bisphenol F of the formula

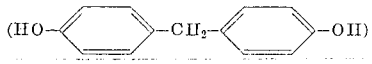

and Tetrachlorobisphenol A.

Especially good results have been achieved in accordance with the polycondensation process of the invention by using those diglycidic ethers obtained from 2,2-bis-(4'-hydroxyphenyl)-propane, hydroquinone or butane-1,4-diol, all of which are readily available or easily prepared. These individual diglycidyl ethers or their mixtures are most suitable where $n$ has a value of 10 to 15.

For reasons of economy and availability, it is particularly desirable to employ diethylene glycol terephthalate as the conventional monomer in the polycondensation reaction, i.e., as in the normal production of polyethylene terephthalate. However, the glycol component of the conventional monomer employed for producing injection molding composition in accordance with the invention can generally be selected from the class of aliphatic glycols such as ethylene glycol, propylene glycol, butylene glycol, including cycloaliphatic glycols, e.g., 1,4-dihydroxymethylcyclohexane. Such glycols thus contain from two to about 10, preferably two to six, carbon atoms. Mixtures of such glycols may also be used, e.g., using small amounts of up to about 10 molar percent of other gylcols in combination with ethylene glycol. It is preferable to employ a small excess of the glycol, based on the amount of terephthalic acid originally used.

The injection molding compositions can be prepared in various ways in accordance with the invention. In one method, a terephthalic acid ester, e.g., dimethyl terephthalate, is first reesterified with a glycol such as ethylene glycol in a conventional manner. This leads to the liberation of methanol and the formation of the corresponding bis-glycol terephthalate.

It is desirable to use conventional catalysts for the reesterification reaction, e.g., sodium hydroxide, potassium methylate, calcium acetate or zinc acetate. Obviously the diglycol terephthalate can be prepared directly from terephthalic acid and a glycol. It is preferable to then add 0.1 to 5 percent by weight of the diglycidic ether to the diglycol terephthalate, e.g., in an autoclave. The temperature is then raised over the course of 1 to 2 hours to about 280° C. while stirring and the autoclave is simultaneously evacuated to a vacuum of approximately 2 mm. hg. or less. The polycondensation reaction can be stopped when the product has reached a relative viscosity, which is also known as the solution viscosity, of 1.4 to 1.8, preferably 1.6 to 1.8. This value if usually reached in less than 1 hour. All solution viscosity values given herein are measured as a 1 percent by weight solution of the polymer in m-cresol at 25° C.

The diglycidic ether may alternatively be added before the initial reesterification or esterification steps employed to obtain the diglycol terephthalate monomer.

The quantity of diglycidic ether added (0.1 to 5 percent by weight) is based on the amount of terephthalate calculated as dimethyl terephthalate or terephthalic acid.

The polycondensation is carried out in the presence of suitable catalysts, such as those which are commonly used for the production of polyethylene terephthalate. Antimony oxide, germanium oxide and lanthanum phosphate are examples of such conventional catalysts.

As has been mentioned, the polycondensation reaction is preferably stopped when the product has attained a solution viscosity of about 1.6 to 1.8 In practice, the viscosity of the reaction melt is constantly monitored using a suitable instrument, e.g., a rotational viscometer. A calibration curve can be easily obtained for the relationship between the solution viscosity and the viscosity determined by the rotational viscometer. Hence, the reaction can be easily controlled. A relatively long residence time or uncontrolled reaction period of the monomers in the reaction vessel under the reaction conditions leads to an extremely fast and uncontrollable rise in the viscosity and products with reproducible properties cannot be obtained. Also, if the reaction is not quickly ended at a solution viscosity of 1.6 to 1.8, the product becomes so viscous after a short time that it can be removed from the autoclave only with great difficulty.

The intermediate product is preferably removed from the reaction vessel as a strip or band or in the form of noodles or rods of small diameter, which are solidified by cooling with a suitable cooling medium, e.g., water, and are then cut or granulated into small particles. These solid particles are then kept under vacuum or under a nitrogen atmosphere or other inert atmosphere and are maintained at a temperature between about 180° and 230° C. The product is further condensed by this treatment which is terminated when the product has attained the required melt index.

The melt index is determined according to the method of DIN 53 generally E (German Industrial Standard). This measurement employs a melt viscosimeter (Göttfert), the cylinder being maintained at a temperature of 290° C., the weight of the piston amounting to 4.32 kg., and the exit nozzle having a diameter of 2.1 mm. In making the measurement, the polymer is heated up in the cylinder for 2 minutes, the melt is then permitted to flow out, and after 4 minutes there is measured the amount of melt which flows out in a time interval of 1 minute. This value is extrapolated to 10 minutes for the melt index as set forth in this specification. Compositions having a melt index between about 50 and 0.5 g./10 min. have proved to be generally suitable for the production of injection molded articles. Those compositions which have a melt index between 1 and 20 g./10 min. are particularly suitable.

The injection molding compositions can also contain about 0.5 to 20 percent by weight of a polyolefin, especially polyethylene or a poly-alpha-monoolefin of a three to six carbon atom monoolefin. By making such additions, the notch impact resistance in particular is increased. The addition of the appropriate polyolefin or mixture of polyolefins is carried out after the solidified product has been cut into particulate form. The polyolefins can be mixed, e.g., in powder or granulated form, with the particles of the polycondensate, and the mixture is then melted in an extruder and regranulated. The shearing forces which occur in the extruder cause a thorough mixing and melt blending of the individual polymer components, i.e., the polycondensate of step (B) and the polyolefin.

The process according to the invention permits the production of injection molding compositions of a particularly good homogeneity. The natural color of the material is very good. Also, the injection molding compositions produced according to the invention have a much better thermostability than linear polyethylene terephthalate.

By comparison with prior art processes, the invention offers a large number of advantages. First, if no polyolefins are added after solidification, then one working step, i.e., the regranulation, can be avoided. This represents a considerable simplification of the procedure. Furthermore, the products have improved properties, e.g., in terms of heat stability and natural color. The process according to the invention also requires considerably less diglycidic ether than is required when using the previously proposed process in which the diglycidyl ether is only melt blended with the polycondensate. The saving of this diglycidyl ether amounts to 50 percent or more.

The injection molding compositions produced by the process according to the invention differ considerably from conventional linear polyesters. Linear polyethylene terephthalates contain practically only ester bonds, which are formed by the reaction of the alcohol or glycol groups with carboxyl groups, whereas the injection molding compositions provided by the invention also comprise ester bonds of secondary alcohol groups, and also phenolic or aliphatic or other bonds. Both branched and cross-linked structures are present, which is apparent from the insolubility of the final polycondensate in organic solvents and the rapid rise in viscosity. Solvents which have a strong dissolving power for polyethylene terephthalate have only a softening action for the polycondensate provided by the present invention.

The injection molding compositions prepared according to the invention can be satisfactorily processed into injection molded articles and can be handled smoothly and without difficulty in conventional injection molding machines. Since the properties of the compositions remain substantially constant while they are being processed, it is very simple to produce injection molded articles which have uniform and reproducible properties. In particular, the dimensional stability of the injection molded articles are reproducible. The injection molding compositions can for example be used for the production of such objects as plates, cups, buckets, housings and beer casks.

However, because of the relatively extensive cross-linking which takes place, the polycondensate of the invention is unsuitable for the production of fibers, filaments or the like. Surprisingly, this cross-linking is not so extensive as to prevent the product from being used for injection molding.

The invention is illustrated by the following examples.

EXAMPLE 1

1,500 grams of dimethyl terephthalate, 1,200 grams of ethylene glycol, 0.225 grams of zinc acetate, 0.3 grams of antimony trioxide and 7.5 grams (0.5 percent by weight, based on the dimethyl terephthalate) of a diglycidic ether identified as Epikote 1007, which is an epoxidized 2,2-bis-(4-hydroxyphenyl)-propane commonly known as epoxidized Bisphenol A and which has an average molecular weight of 2,900, are mixed together and heated in a reesterification vessel for 2 hours at a temperature of up to 215° C. The methanol which is liberated during the reesterification is distilled off as the reaction proceeds. The mixture is then transferred into a stirred autoclave and is heated under a vacuum to 280° C. The polycondensation of the digylcol terephthalate together with the diglycidyl ether then takes place and ethylene glycol distills off. After about 60 minutes, the solution viscosity is within the range of 1.6–1.8. The melt is then immediately withdrawn in the usual manner under a small pressure of nitrogen as extruded rods or noodles and is worked up into granulated particles or cuttings. The cuttings are then kept under a vacuum of 0.1–2 mm. hg. for 12 hours at a temperature of 220° C. The melt index of product is 18.9 g./10 min. This product is then injection molded into various articles, e.g., cups, plates, standard test bars and the like.

EXAMPLE 2

The same proportions and procedure as used in example 1 are employed except that 11.25 grams (0.75 percent based on the dimethyl terephthalate) of the diglycidic ether are used. In this case the polycondensation time is reduced from about 60 minutes to 45 minutes, and the time required for heating the solid product at 220° C. is reduced to 5 hours in order to obtain a product of the same solution viscosity and of the same melt index. Thus, the total reaction times are significantly reduced by adding only a slightly greater amount of the diglycidyl ether.

EXAMPLE 3

50 kg. of dimethyl terephthalate, 40 liters of ethylene glycol, 7.5 grams of zinc acetate and 10 grams of antimony trioxide are mixed and heated in a suitable reesterification vessel for 3 hours at a temperature of up to 230° C. After the reesterification is complete, the melt is transferred to a stirred autoclave and 250 grams of the diglycidic ether "Epikote 1007" (0.5 percent by weight, based on the dimethyl terephthalate) are introduced and the mixture is heated under vacuum for 1 hour at a temperature of up to 250° C. Heating is then continued for 1 hour at a temperature of up to 280° C., while a vacuum of less than 2 mm. hg. is maintained. The melt with a solution viscosity in the range of 1.6 to 1.8 is then drawn off under vacuum as a narrow strip in known manner. The further processing is carried out as in example 1 to achieve a melt index of various samples in a range of 1 to 20 gms./10 min., all of these samples exhibiting excellent properties when injection molded.

EXAMPLE 4

19 kg. of cuttings, which are obtained according to the process of example 3, are regranulated in known manner prior to further heating and condensation with 1 kg. of high-pressure, high molecular weight polyethylene in a double-screw extruder at 270°–300° C. The regranulated product is then kept for 5 hours at a temperature of 220° C. under a vacuum of 0.1 to 2 mm. hg., the resulting product exhibiting excellent properties of both dimensional stability and impact resistance after being injection molded.

Example 5

Using an injection molding machine, standard bars are produced from the material prepared according to example 4. The properties obtained are given in the following table.

TABLE

| Melt index (g./10 min. at 290° C.) | Injection temperature °C. | Martens temperature °C. | Impact resistance (kg. cm./cm.²) |
|---|---|---|---|
| 3.3 | 280 | 61 | 200 |
| Notch impact resistance | | Yield point | |

| (kg./cm./cm.²) | (kg./cm.²) |
|---|---|
| 5.52 | 680 |

Similar good results can be achieved when using correspondingly small amounts of an epoxidized butane-1,4-diol or hydroquinone as the diglycidal ether.

EXAMPLE 6

The same proportions and procedure as used in example 1 are employed except that 7.5 grams (0.5 percent based on the dimethylterephthalate) of the diglycidic ether derived from butane-1,4-diol are used. In this case the polycondensation time is about 40 minutes and the time required for heating the solid product at 220° C. is 5 hours. The melt index of this product is 4.2 g./10 min.

EXAMPLE 7

The same proportions and procedure as used in example 1 are employed except that 15 grams (1 percent based on the dimethylterephthalate) of the diglycidic ether derived from hydroquinone are used. In this case the polycondensation time is reduced to 30 minutes, the time required for heating the solid product at 220° C, is reduced to about 2 hours. The melt index of the product is 7.4 g./10 min.

The invention is hereby claimed as follows:

1. In a process for the catalytic polycondensation of a diglycol terephthalate at temperatures between about 150° and 300° C., the improvement for producing a polycondensate for injection molding which comprises:

A. incorporating as a monomeric coreactant with said diglycol terephthalate about 0.1 to 5 percent by weight, with reference to the amount of terephthalate calculated as dimethyl terephthalate, of a diglycidal ether of the formula

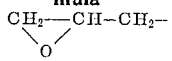

$$\left[ \text{O}-\text{R}-\text{O}-\text{CH}_2-\underset{\underset{\text{OH}}{|}}{\text{CH}}-\text{CH}_2 \right]_n -\text{O}-\text{R}-\text{O}-\text{CH}_2-\text{CH}\diagdown\!\!\!\!\underset{\text{O}}{\diagup}\!\!\!\!\text{CH}_2$$

wherein $n$ is an integer of from 0 to 30 and R is a divalent radical selected from the class consisting of a saturated aliphatic hydrocarbon of two to 10 carbon atoms and the residue of an epoxidized dihydric phenol;

B. immediately cooling and solidifying the polycondensation reaction mixture after it has attained a solution viscosity of between 1.4 and 1.8, measured as a 1 percent by weight solution of the polymer in m-cresol at 25° C.; and C. subsequently further condensing the product of step (B) under an inert atmosphere and in the solid phase at temperatures between about 180° and 230° C. until the solid product has a melt index between 50 and 0.5 grams/10 minutes.

2. A process as claimed in claim 1 wherein the diglycol terephthalate is diethylene glycol terephthalate.

3. A process as claimed in claim 1 wherein the polycondensation reaction mixture is solidified in step (B) after it has attained a solution viscosity of 1.6 to 1.8.

4. A process as claimed in claim 3 wherein the diglycol terephthalate is diethylene glycol terephthalate.

5. A process as claimed in claim 1 wherein said further condensation in step (C) is carried out until the solid product has a melt index of between about 1 and 20 grams/10 minutes.

6. A process as claimed in claim 1 wherein the solid product of step (B) is homogeneously admixed with about 0.5 to 20 percent by weight thereof a polyolefin with the mixture being regranulated before carrying out step (C).

7. A process as claimed in claim 1 wherein said diglycidyl ether is an epoxidized 2,2-bis-4-hydroxyphenyl propane.

8. A process as claimed in claim 1 wherein the monomeric mixture being polycondensed in step (A) is obtained by transesterification of dimethyl terephthalate with ethylene glycol, and said diglycidyl ether is added at least at the beginning of the polyconsation reaction.

9. A process as claimed in claim 1 wherein the solid product of step (B) is reduced to particulate form before being subjected to said further condensation in step (C).

10. The product obtained by the process of claim 1.

11. A process as claimed in claim 6 wherein said polyolefin is selected from the group consisting of polypropylene, poly-4-methylpentene 1 and polyethylene.

12. A process as claimed in claim 11 wherein said polyolefin is polyethylene having a density of from 0.915 to 0.930.

* * * * *